June 4, 1935.　　T. ROBINSON　　2,003,699
ROOFING PRODUCT
Filed Sept. 12, 1930　　2 Sheets-Sheet 1
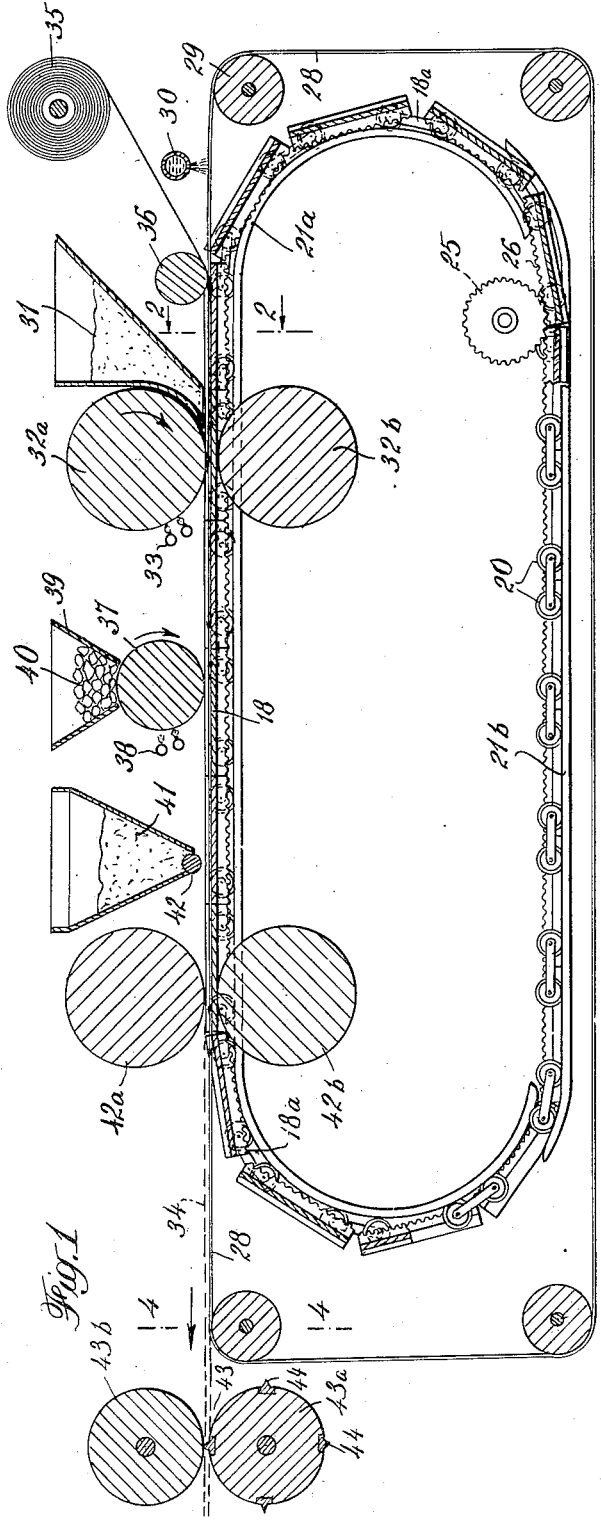
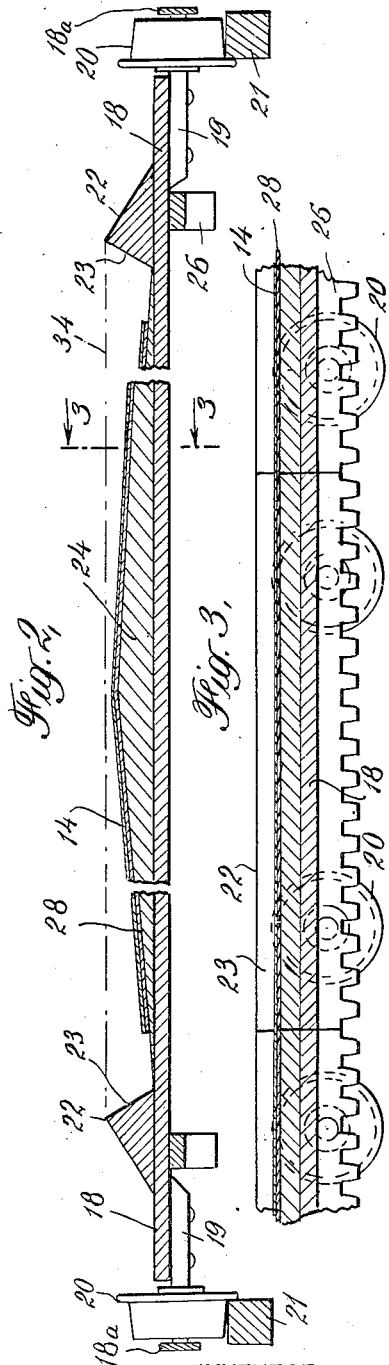
INVENTOR
Thomas Robinson
BY
ATTORNEYS

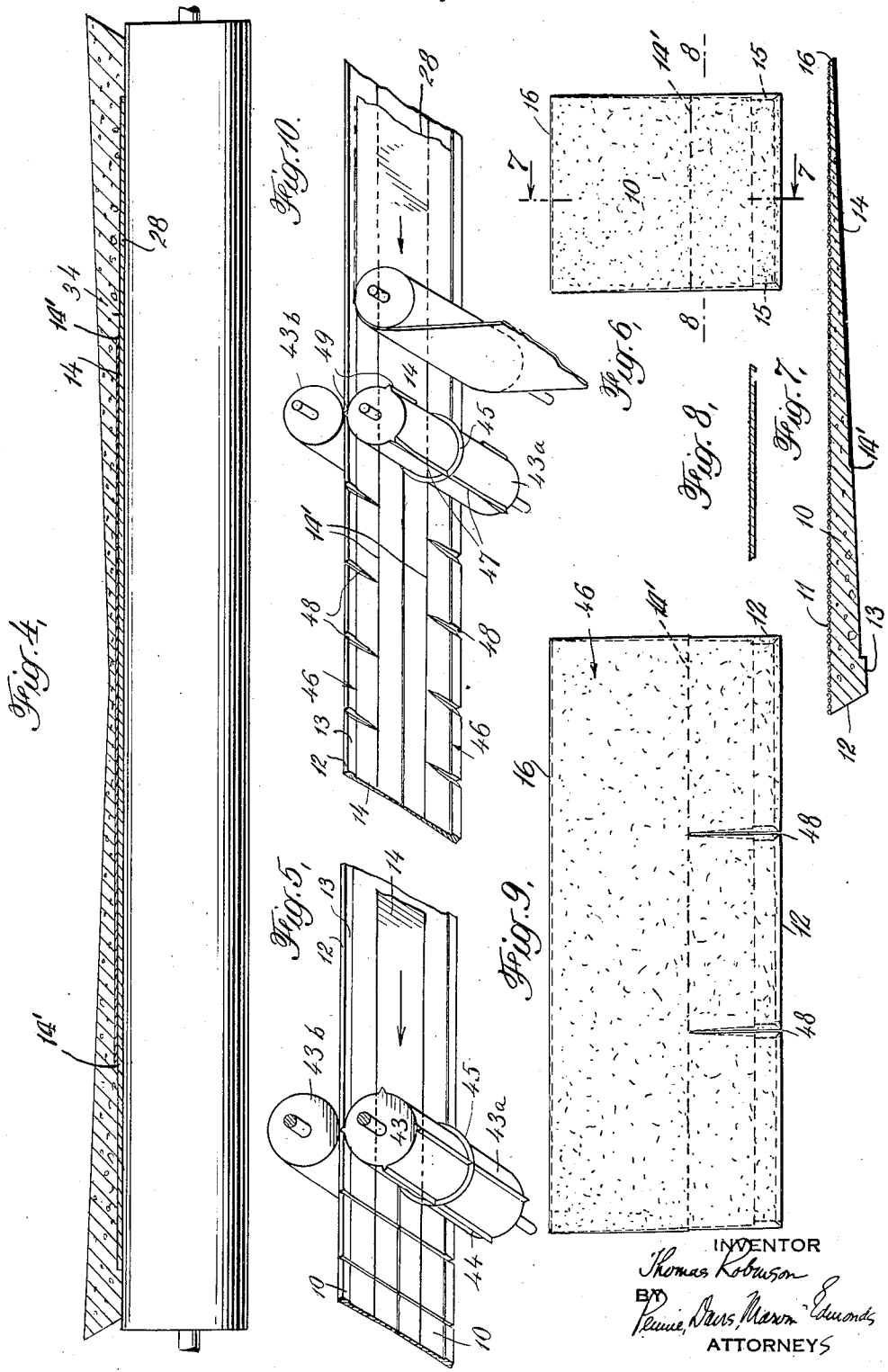

Patented June 4, 1935

2,003,699

UNITED STATES PATENT OFFICE 2,003,699

ROOFING PRODUCT

Thomas Robinson, Goldenbridge, N. Y., assignor to Lancaster Asphalt, Inc., New York, N. Y., a corporation of Delaware Application September 12, 1930, Serial No. 481,412

2 Claims. (Cl. 108—8)

This invention relates to the manufacture of building products and is concerned more particularly with a novel building product made of a hardened plastic material. The building product of this invention is particularly adapted for roofing purposes and a form of the product suitable for that purpose will presently be described in detail, though it is to be understood that the product may be made in other shapes and forms suitable for other purposes.

The product of the invention is made of a hardened plastic substance which preferably includes a bituminous material and a binder. Asphalt is a bituminous compound well adapted for the purpose, the asphalt used having a melting point such that it is able to withstand solar heat. To give the finished product the necessary stiffness and strength, there is incorporated in the asphalt a quantity of filling material preferably of a fibrous character. This filling material may be straw, paper, and other fibrous products of that sort to which, if desired, may be added a quantity of ground cork to give body to the mass without adding greatly to the weight, and in some cases a proportion of mineral material, such as cinders, crushed slate, slate dust, and the like, may also be used for providing additional stiffness.

According to the new method, the building products are made by a continuous operation which involves producing a plastic mixture of the ingredients above referred to, sheeting out this mixture into a web, applying a suitable surfacing material to the face of the web, and then cutting the web into units of the desired size and shape. In the manufacture of shingles which are preferably made of tapering thickness from end to end, the sheet is formed with an irregular cross-section and in one form of the invention, a sheet of the plastic material is produced which is thinnest along its median line and of increasing thickness outwardly therefrom toward the side edges. After the formation of and application of surfacing material to this sheet, the latter is slit lengthwise to form two bands and the bands cut transversely to form tapering shingle units. If desired, the products may be provided with a reinforcement and for this purpose, I prefer to use a light weight felt which is applied to the under surface of the web during the sheeting out of the plastic material. This felt strip is incorporated into the face of the plastic web and becomes an integral part of the finished material.

The apparatus employed for the production of the new products includes a source of supply of plastic material which is delivered in soft moldable condition to sheeting rolls. Preferably the plastic mixture is discharged upon a conveyor by which it is passed between the sheeting rolls and the conveyor forms part of a continuous movable mold which supports to plastic sheet throughout the successive operations and until the web is delivered to the cutting devices. Associated with the sheeting rolls are suitable devices for frictioning the surface of the web to make it smooth, means for applying, if desired, an adhesive film to the surface of the web, and means for distributing surfacing material on the web and embedding particles therein.

For a better understanding of the invention, reference may be had to the accompanying drawings, in which Fig. 1 is a view of the apparatus used for the production of the new material, certain of the parts being illustrated diagrammatically and others in cross-section;

Fig. 2 is a transverse sectional view through the apparatus on the line 2—2 of Fig. 1;

Fig. 3 is a sectional view on the line 3—3 of Fig. 2;

Fig. 4 is a sectional view on the line 4—4 of Fig. 1;

Fig. 5 is a view in perspective illustrating the action of the cutting apparatus;

Fig. 6 is a plan view of a single roofing element of the invention;

Figs. 7 and 8 are sectional views on the lines 7—7 and 8—8 of Fig. 6;

Fig. 9 is a plan view of a multiple roofing element constructed in accordance with the invention; and Fig. 10 is a view similar to Fig. 5 illustrating the cutting of multiple shingle units.

Referring now to the drawings, the new building material in the form of an individual or single shingle is illustrated in Figs. 6 and 7. This shingle consists of a body 10 having a surfacing 11 of suitable mineral, such as crushed slate or other products commonly used for the purpose. The body of the shingle is of generally rectangular shape and it is composed of hardened plastic material, preferably asphalt and a filling mixture including ingredients above mentioned. The plate is of tapering thickness from one end to the other and its butt end 12 is undercut so that when the shingle is laid with others in the usual overlapping courses, the inclined surface of the butt gives the impression of greater thickness than is actually the case. The under surface of the shingle has portions in two offset planes, one of these portions constituting a transverse shoulder or rib 13, at one side of which the thickness of the shingle abruptly decreases. With this arrangement, the shingle may have a substantial thickness at the butt and a saving of material may be effected. At the same time, the shingle has sufficient stiffness imparted thereto so that the abrupt decrease in thickness at one side of the shoulder does not result in the upper surface of the shingle sagging when laid. The shingle may be provided with a reinforcement 14 in the form of a band of fibrous material such as light weight felt which is affixed to the under surface of the shingle and may extend from the thin edge up to a point slightly beyond the central portion of the shingle, or omitted entirely when relatively stiff plastic mixtures are employed. A dotted line in Fig. 6 marks the edge 14' of the reinforcing sheet 14. The side edges 15 and the rear or thin edge of the shingle overhang from top to bottom; that is, each edge slopes inwardly and downwardly from the top of the shingle toward the bottom. This shaping of the edges is produced during the formation of the shingle and provides each shingle with the maximum grit surfaced area, while reducing the amount of plastic substance used in the shingle.

In the manufacture of the shingles, the apparatus illustrated conventionally in Fig. 1 may be employed. This apparatus includes a conveyor in the form of a plurality of mold carriages generally designated 17. Each carriage consists of a plate 18 having axles 19 projecting therefrom at the ends and carrying wheels which run on rails 21. Adjacent carriages are connected together by links 18a to form an endless chain. The rails 21 are arranged in pairs and throughout a part of the path of travel of the conveyor, the rails 21a lie in such position that the conveyor carriages are supported with the plates 18 uppermost, while through another part of the path of travel of the conveyor, the rails 21b support the conveyor with the carriage plates 18 downward.

Each plate 18 is provided with a pair of spaced knife edges 22 extending across the plate in the direction of conveyor movement and the knife edges have inner faces 23 sloping to conform to the undercut butt ends 12 of the products to be made. On the face of each plate between the knife edges 22 is a mold plate 24 which has its greatest thickness at the middle of the plate 18 and tapers in thickness from its median line toward the knife edges 22 on either side thereof.

The carriages travel in a closed path in a vertical plane and the path has upper and lower horizontal stretches. The carriages are advanced by means of pinions 25 on a driven shaft, which mesh with racks 26 on the under surface of each carriage. In the horizontal stretches, the carriages lie with their adjacent ends in close contact so as to provide a continuous receiving surface on which the molding operation is carried out. In order to insure that the under surface of the sheet produced will be smooth and also to provide support for the sheet beyond the carriages, an endless belt 28 led about rollers 29 is arranged so that the upper stretch of the belt lies in close contact with the faces of the carriages. This belt may be of different materials but is preferably of canvas. Water is discharged on the belt by a spray pipe 30 just before the plastic material is discharged on the belt to cool it and also to prevent adherence of the plastic material thereto. If desired, a cleaning device such as a brush or the like may also be employed to remove adhering material. The belt is preferably somewhat narrower than the distance between the knife edges 22 on the carriages and assists in the formation of the shoulder 13 on the units.

The plastic material to be sheeted out may be prepared in any suitable way but I prefer to employ the mechanism illustrated in my co-pending application, Serial No. 391,297, filed September 9, 1929, and in my Patent No. 1,732,281. The raw materials employed include asphalt pulverized or broken up into relatively small pieces and filling material, such as chopped hay or other similar fibrous substances, ground cork, cinders, and the like. Assuming that fibrous material alone is to be used, this material is cut up into relatively fine condition by a suitable chopping machine and the asphalt is broken up to the desired size in any convenient manner. The pulverized asphalt and the chopped fibrous material are then combined and reduced to a homogeneous plastic condition by being subjected to a succession of shearing operations, alternating with agitating and mixing. The materials are preferably introduced into a chamber in which there are rotating knives which cooperate with stationary knives to perform a shearing action, and the asphalt and fibre are thus reduced to a fine state by the successive shearing operations, and the heat generated thereby softens the asphalt and renders it plastic.

The plastic material received from shearing apparatus is delivered to a hopper 31, from which it is discharged upon the belt just in front of rollers 32a and 32b. The upper roller 32a lies above the connected carriages which form the movable mold surfaces and this roll is slightly longer than the distance across a carriage between knife edges 22 so that the roll bears against the knife edges. The lower roll 32b bears against the under surfaces of the carriages and thus supports the carriages during the application of pressure which performs the sheeting operation. The lower roll is slightly shorter than the distance between the racks on the under surface of the carriages. By this construction, the carriages and supporting rails are not subjected to the pressure of the roller 32a in the sheeting operation but are supported by the fixed roller 32b. The surface of the roller 32a is preferably heated, for instance, by burners 33.

The plastic material fed from the hopper into the bight of the rolls is sheeted out so as to form a web 34 having a flat upper surface as indicated in dotted lines in Fig. 2. The web is of tapering thickness from the median line outwardly toward the side edges and the side edges are undercut.

When a reinforcement or stiffening sheet is to be applied, the reinforcing material 35 is drawn from a supply and passed under a guide roller 36 which directs it to a position on top of the carriages so that the plastic material is discharged on top of the reinforcement and the latter is incorporated in the web by the action of the pressure rolls 32a and 32b.

The plastic web advances from the pressure rolls to a roll 37 heated in any convenient manner, as by burners 38, and bearing against the surface of the web with a yielding pressure. The roll 37 is driven at a higher rate of speed than the web and it frictions the surface of the web, making it smooth. Also, the hot roll causes the asphalt in the web to soften and come to the surface, forming a coating on the surface of the web which covers any parts of the filling material which might otherwise be exposed. If desired, the frictioning roll may also be used for the application of a film of adhesive to the surface of the web and when so used, a hopper 39 is placed above the roll 37 to hold a supply of coating material 40 in contact with the surface of the roll 37. Asphalt is preferably employed for the purpose and it is introduced into the hopper in the form of chunks of substantial size. The heated roll 37 coming in contact with the chunks of asphalt picks up a film which is then applied to the surface of the web.

If the plastic sheet is to be given a coating or surfacing material such as crushed slate, the surfacing material is placed in a hopper 41 at the lower end of which is a distributing roll 42 by which a shower of the particles is discharged on the surface of the web. Beyond the hopper 41 are pressing rolls 42a, 42b, for causing the particles to be partially embedded in the surface of the web or in the adhesive coating when the latter is employed.

Beyond the embedding rollers the plastic web supported on the belt 28 is carried away from the mold carriages and delivered to cutting devices 43, which have different forms according to the products to be produced. As illustrated, the lower cutting device 43a is in the form of a cylinder having knife edges 44 mounted thereon, the knives cooperating with a smooth surfaced upper roll 43b. For the manufacture of single shingles, the devices illustrated in Fig. 5 are employed in which the roll 43a is provided with a circumferential cutting edge 45 which slits the web lengthwise along its median line and longitudinal knives 44 which cut the two bands of material produced by the slitting operation into individual units 10.

To make multiple units, such as that illustrated in Fig. 9 and designated 46, the lower roll 43a is provided with the circumferential knife edge 45 and longitudinal knife edges 47. Multiple shingles are preferably provided with notches 48 along one edge, so that these elements when laid in overlapping courses in the ordinary manner have the appearance of individual shingles. These notches are produced by knife edges 49 mounted on the cylinder 43a near the ends thereof. All the knife edges used for slitting and cutting purposes are of the scoring type and they produce lateral and butt edges 15, 12 and 16 on the units which slope downwardly and inwardly from the top surface thereof. The units severed from the web by the cutting edges are either completely detached one from another or else they are so deeply scored that they may be readily separated by a workman. The units are stacked and bundled together in any appropriate manner ready for shipment.

With the method and apparatus of the invention, there is a continuous succession of operations involving the preliminary sheeting out of the plastic material to form a web having a cross-section appropriate for the production of the final products. This web is advanced continuously to the devices for finishing the surface, including the application of grit, and then cut into units of any desired shape. By this method, the material may be produced at a low cost and a relatively high output rate and the new products are much cheaper than the ordinary prepared roofings now in wide use due to the fact that the main body of the elements is made up of asphalt and filling material instead of rag felt which is relatively expensive. Also, the new products being made of plastic material may be given any desired shape and size without difficulty and may have a substantial thickness whereas ordinary felt roofings are usually quite thin and are objectionable for that reason.

What I claim:

1. A roofing element which comprises a plate-like body of hardened plastic material, said body having its sides and butt edge undercut, a stiffening rib formed in the body of said plastic material extending transversely of the body along the butt edge and on one surface of the body only and a reinforcing web of fibrous material on the said surface extending from side to side and from the front edge to slightly beyond the central portion of said surface, said web being permanently united to the said body.

2. A roofing element which comprises a plate-like body of hardened plastic material, said body having its sides and butt edge undercut, a stiffening rib formed of said plastic material and integral with the body arranged to extend along the butt edge on one surface only, a reinforcing web of fibrous material on said surface extending from side to side and from the front edge to slightly beyond the central portion of said surface and spaced, cut-out notches extending inwardly from said butt end.

THOMAS ROBINSON.